United States Patent
Spivey et al.

[11] Patent Number: 5,979,504
[45] Date of Patent: Nov. 9, 1999

[54] ROTARY CONTROL VALVE

[75] Inventors: William J. Spivey, Joliet; Michael L. Knussman, East Peoria; Arlyn P. Wilcox, Sycamore, all of Ill.

[73] Assignee: Caterpillar Inc., Peoria, Ill.

[21] Appl. No.: 08/642,038

[22] Filed: May 2, 1996

[51] Int. Cl.[6] .......................... B62D 11/18; F16R 31/524
[52] U.S. Cl. .............................. 137/636.1; 137/625.21; 60/444; 91/375 R; 180/6.44
[58] Field of Search ...................... 91/375 R; 137/625.21, 137/625.23, 625.6, 636, 636.1; 180/6.34, 644, 441; 60/444

[56] References Cited

U.S. PATENT DOCUMENTS

| | | | |
|---|---|---|---|
| 2,880,756 | 4/1959 | Puls | 137/624 |
| 3,320,745 | 5/1967 | Bahniuk et al. | 91/375 R |
| 3,347,041 | 10/1967 | Bahniuk et al. | 91/375 R |
| 3,502,104 | 3/1970 | Tsuchiya et al. | 137/596.14 |
| 4,184,387 | 1/1980 | Kiritani et al. | 180/6.44 |
| 4,281,684 | 8/1981 | Broeg | 137/625.21 |
| 4,335,745 | 6/1982 | Bouveret et al. | 137/625.23 |
| 4,400,938 | 8/1983 | Ohe | 180/441 |
| 4,471,808 | 9/1984 | Thomsen et al. | 251/205 |
| 4,471,809 | 9/1984 | Thomsen et al. | 251/205 |
| 4,512,238 | 4/1985 | Bacardit | 91/370 |
| 4,700,794 | 10/1987 | Bernhagen et al. | 180/6.44 |
| 4,711,315 | 12/1987 | Kitamura | 180/441 |
| 4,869,065 | 9/1989 | Hopkins | 60/444 |
| 4,955,442 | 9/1990 | Crabb et al. | 180/6.44 |
| 5,048,630 | 9/1991 | Schaffer | 137/625.23 |

FOREIGN PATENT DOCUMENTS 2158021  11/1985  United Kingdom.

*Primary Examiner*—George L. Walton
*Attorney, Agent, or Firm*—John W. Grant; J. W. Burrows

[57] ABSTRACT

A rotary control valve includes a directional control valve having a rotatable valve element for controlling the direction of fluid flow from an input passage to a pair of control ports and from the control ports to a drain passage. A pressure regulating valve is connected to a source of pilot pressure and has a valve spool for controlling the regulated pressure level of pilot fluid in the input passage. A cam is connected to the valve element for unitary rotation therewith. A spring and a plunger are disposed between the valve spool and the cam so that the valve spool is mechanically moved in a rectilinear direction by the cam in either direction from a neutral position to increase the level of the regulated pressure in the input passage proportional to the degree of rotation of the rotatable valve element.

17 Claims, 3 Drawing Sheets

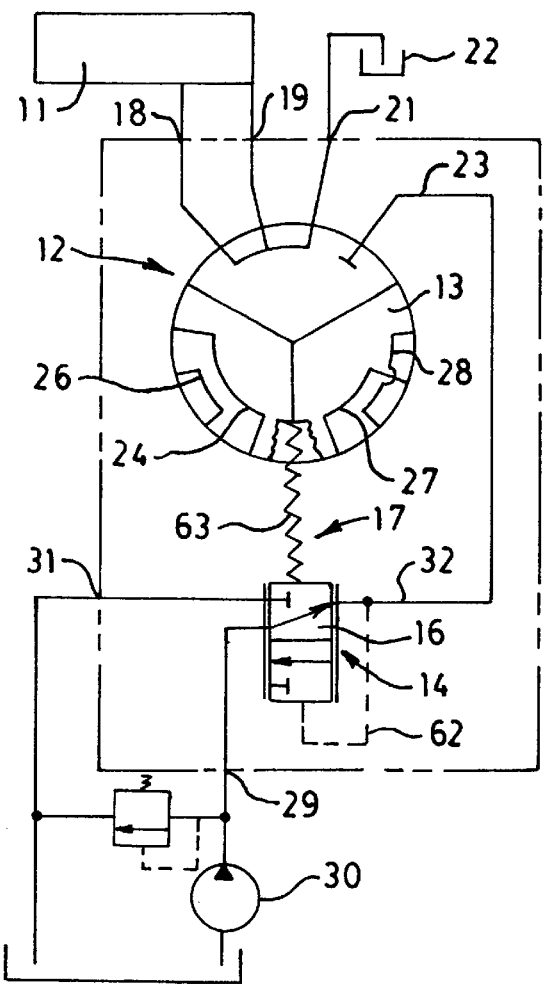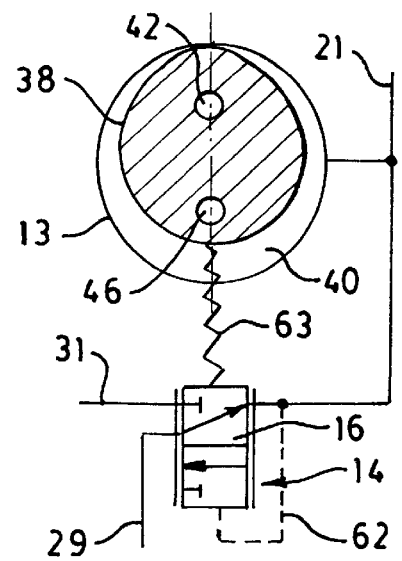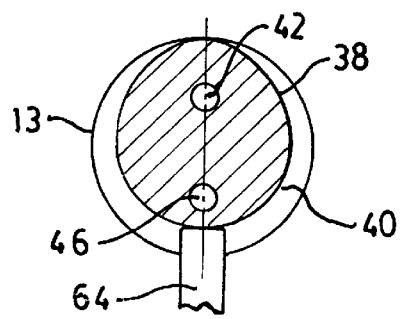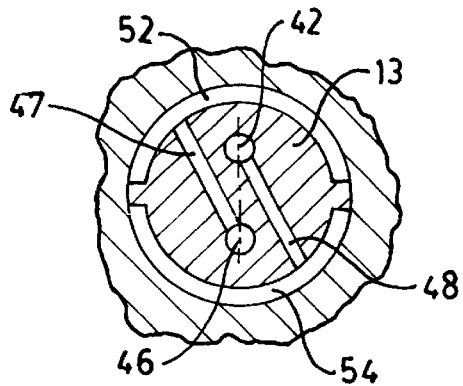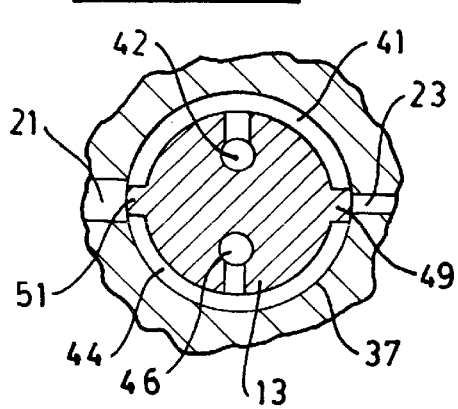

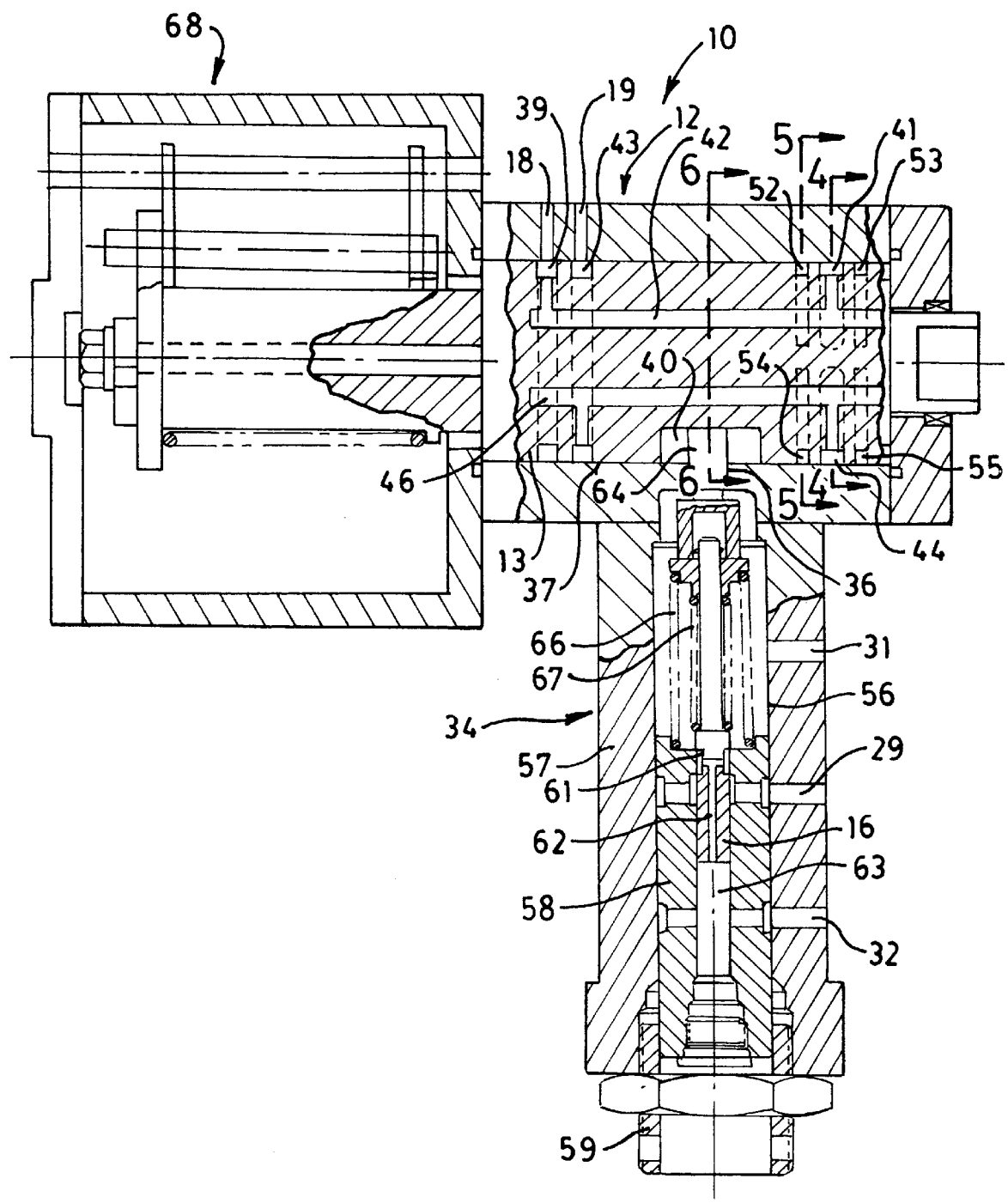
Fig_3.

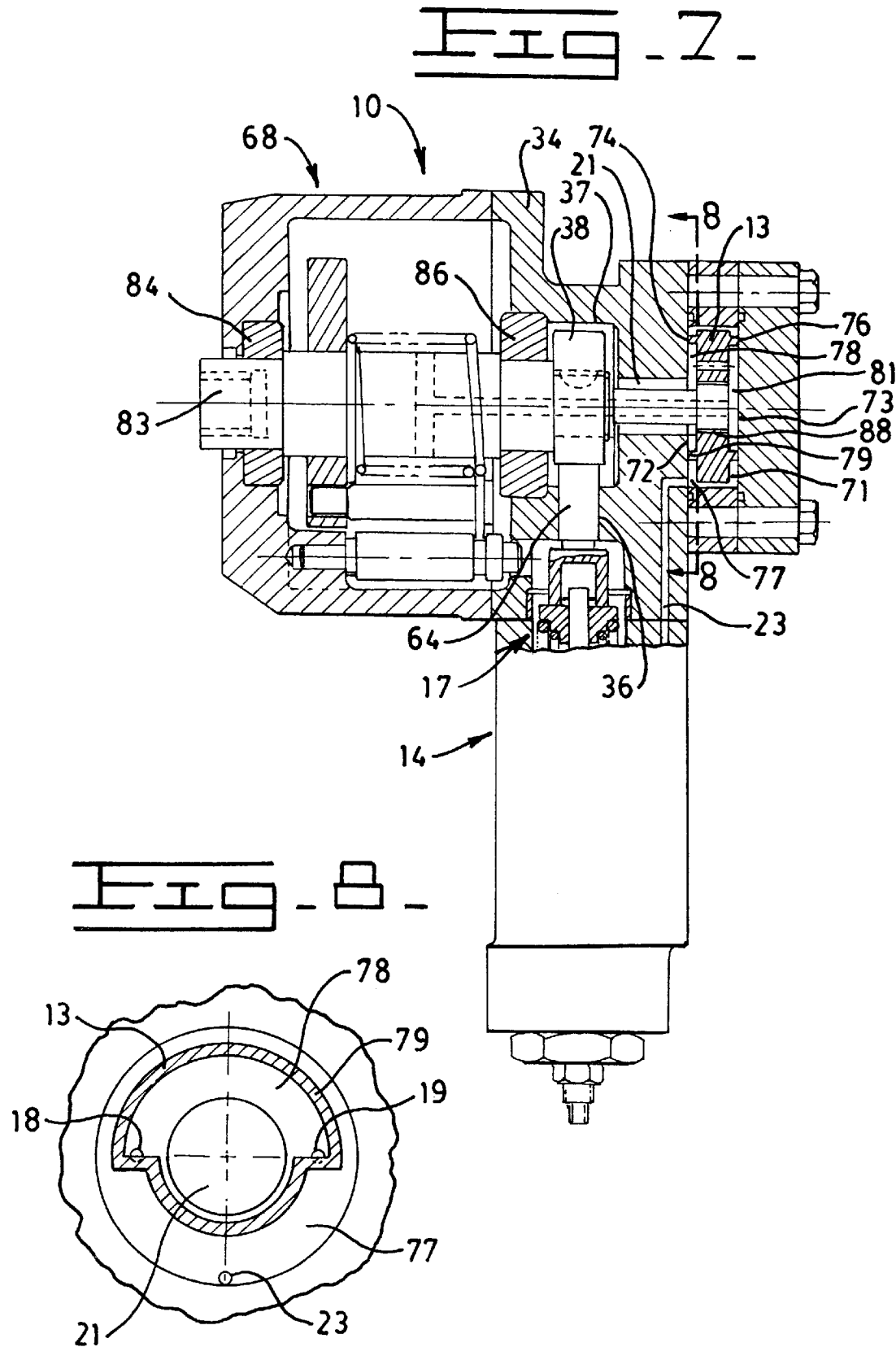

ROTARY CONTROL VALVE

TECHNICAL FIELD

This invention relates generally to a rotary control valve device and, more particularly, to one having a rotatable valve element for controlling direction of fluid flow and a pressure regulating valve for regulating the output pressure in proportion to the rotary motion of the valve element.

BACKGROUND ART

U.S. Pat. No. 4,955,442 illustrates a steering mechanism for converting the rotational movement of a steering wheel to linear actuation of one or the other of a pair of pressure regulating pilot valves connected to the main steering control. That mechanism includes an input shaft and a single actuating cam which are conjointly rotatable away from a neutral position in either direction. A cam follower assembly is cooperatively associated with a substantially spiral shaped cam slot defined in the actuating cam and includes a cam following roller wheel received in the guide slot. The cam follower assembly also includes a bell crank supporting the roller wheel and indirectly connected to the pilot valves so that rotating the input shaft imparts controlled displacement of the control valves.

The steering mechanism of the above noted patent is overly complex and requires an excessive amount of space. Thus it would be desirable to have a simpler, more compact and more economical steering valve that provides substantially the same operating characteristics as that patent.

The present invention is directed to overcoming one or more of the problems as set forth above.

DISCLOSURE OF THE INVENTION

In one aspect of the present invention, a rotary control valve device includes a directional control valve having an input passage and first and second control ports, a valve element having a neutral position and being rotatable in a first direction therefrom to communicate the input passage with the first control passage and in a second direction therefrom to communicate the input passage with the second control passage; a pressure regulating valve connectible to a source of pilot fluid and having an output port communicating with the input passage of the directional control valve and a valve spool movable in a rectilinear direction to regulate the pressure level in the outlet port; and means for mechanically imparting the rectilinear movement to the valve spool when the valve element is moved in either direction from the neutral position.

BRIEF DESCRIPTION OF THE DRAWINGS

FIG. 1 is a schematic illustration of the rotary control valve device of the present invention;

FIG. 2 is a diagrammatic cross-sectional view of a portion of the valve device of FIG. 1;

FIG. 3 is a diagrammatic cross-sectional view of one embodiment of the valve device of FIG. 1 with certain portions shown in elevation and with other portions broken away to show details of construction thereof;

FIGS. 4–6 are sectional views taken along lines 4—4, 5—5 and 6—6, respectively of FIG. 3;

FIG. 7 is a diagrammatic cross-sectional view of another embodiment of the valve device of FIG. 1 with certain portions shown in elevation and with other portions broken away to show details of construction thereof; and FIG. 8 is a sectional view taken along line 8—8 of FIG. 7.

BEST MODE FOR CARRYING OUT THE INVENTION

A rotary control valve device 10 is adapted for use as a pilot control for a steering system 11 of an industrial or agricultural machine in which steering is achieved by rotating a steering wheel in opposite directions from a neutral position.

The valve device 10 includes a directional control valve 12 having a rotary valve element 13, a pressure regulating valve 14 having a valve spool 16 movable in a rectilinear direction and a means 17 for mechanically imparting rectilinear movement of the valve spool 16 when the valve element 13 is moved in either direction from a neutral position.

The directional control valve 12 includes a pair of control ports 18,19 connected to the steering system 11, a drain port 21 connected to a tank 22, and an input passage 23. The rotary valve element 13 has a neutral position at which the control ports 18,19 communicate with the tank port 21 and are blocked from the input passage 23. Rotating the valve element 13 clockwise, as viewed in FIG. 1, establishes communication between the input passage 23 and the control port 18 through a flow path 24 while maintaining communication between the control port 19 and the tank port 21 through a flow path 26. Similarly, rotating the valve element counterclockwise establishes communication between the inlet passage 23 and the control port 19 through a flow path 27 while maintaining communication between the control port 18 and the tank port 21 through a flow path 28.

The pressure regulating valve 14 includes a supply port 29 connected to a pump 30, a tank port 31 connected to the tank 22, and an outlet 32 communicating with the inlet passage 23 with the valve spool 16 being movable in a rectilinear direction to regulate the pressure level in the outlet 32.

The directional control valve 12 includes a multi-piece body 34 having a bore 36 disposed perpendicular to and opening into a bore 37. The control ports 18,19, the drain port 21 and the inlet passage 23 open into the bore 37. The valve element 13 is rotatably disposed within the bore 37 and has a cam 38 integrally formed thereon and defining a cam slot 40. The flow path 24 includes an annular groove 39 in the peripheral surface of the valve element 13 continuously communicating with the control port 18, a c-shaped groove 41 in the peripheral surface of the valve element and a passageway 42 continuously communicating the groove 41 with the annular groove 39. The flow path 26 includes an annular groove 43 continuously communicating with the control port 19, a c-shaped groove 44, and a passageway 46 continuously communicating the groove 44 with the annular groove 43. The flow path 27 includes the groove 41, the passageway 46 and the annular groove 43. The flow path 28 includes the annular groove 39, the passageway 42 and the groove 44. The grooves 41 and 44 are disposed within a plane perpendicular to the longitudinal axis of the valve element and are separated from each other by a pair of lands 49,51. In the neutral position of the valve element, the land 49 blocks the input passage 23 from the c-shaped grooves 41 and 44 and the land 51 is sized to provide communication between the grooves 41 and 44 and the drain port. Clockwise rotation of the valve element establishes communication between the input passage 23 and the groove 41, blocks the groove 41 from the drain passage 21 and maintains communication between the groove 44 and the drain passage. Counterclockwise rotation of the valve element establishes communication between the input passage 23 and the groove 44, blocks the groove 44 from the drain passage 21 and maintains communication between the groove 41 and the drain passage.

A pair of force balance grooves 52,53 are disposed on opposite sides of the groove 41 and continuously communicate with the passageway 46 through a pair of passages 47 so that the pressure induced side loads acting on the valve element due to fluid pressure in the groove 44 are balanced. Similarly, another pair of force balance grooves 54,55 are disposed on opposite sides of the groove 44 and continuously communicate with the passageway 42 through a pair of passages 48 so that the pressure induced side loads acting on the valve element due to fluid pressure in the groove 41 are balanced.

Balancing the pressure induced side forces in this manner minimizes friction between the valve element and the bore. Moreover, the inlet passage communicates with the cam slot 40 to minimize the force of the plunger acting on the valve element. With proper selection of the area ratios of the plunger and the spool 16 and the stiffness of the return spring 66, the plunger forces can be held substantially constant throughout the stroke range of the plunger. This also minimizes friction between the valve element and the bore due to plunger side loading while maintaining contact between the plunger and the cam.

The pressure regulating valve 14 includes a bore 56 disposed within a body 57 suitably connected to the body 34 so that the bore 56 is in axial alignment with the bore 36. The tank port 31, supply port 29, and outlet 32 open into the bore 56. The spool 16 of the pressure regulating valve is slidably disposed within a cylindrical cartridge member 58 retained within the bore 56 by an adjustment mechanism 59. The spool includes an annular flow control groove 61 and a passageway 62 communicating the annular groove 61 with a feedback chamber 63 disposed at the lower end of the valve spool and being in continuous communication with the outlet 32. A plunger 64 slidably extends through the bore 36 and is resiliently biased into engagement with the cam 38 by a pair of springs 66,67. The spring 66 is disposed between the plunger 64 and the cartridge member 58 while the spring 67 is disposed between the plunger and the valve spool 14. Thus the spool is directly mechanically actuated by the cam 38 on the spool 16 to regulate the pressure level in the outlet 32. In the position shown, the supply port 29 is essentially blocked from both the tank port and the outlet 32 by the spool. Downward movement of the spool communicates the supply port with the outlet 32 while upward movement communicates the outlet with the tank port. The pressure level of the pilot fluid in the outlet 32 is proportionate to the downward displacement of the plunger 64 and the valve spool 16.

A resilient rotary centering device 68 is connected to the valve element 13 to resiliently bias the valve element to the neutral position.

A second embodiment of the rotary control valve device 10 of the present invention is disclosed in FIGS. 7 and 8. It is noted that the same reference numerals of the first embodiment are used to designate similarly constructed counterpart elements of this embodiment. In this embodiment, however, the valving function is done at one end of the valve element 13 instead of the peripheral cylindrical surface. More specifically, the multi-piece body 34 of the directional control valve 12 includes a cavity 71 defined in part by a pair of opposed parallel walls 72,73 and the valve element 13 is in the form of an annular plate rotatably disposed within the cavity and has a pair of parallel end faces 74,76 sealingly engaging the walls. The inlet passage 23 and the control ports 18,19 open into the cavity 71 through the wall 74. The valve element includes a drain pocket 78 recessed into the face 74 and an inlet region 77 separated by a land 79 sealingly engaging the wall 72. The drain pocket 78 continuously communicates with the drain passage 21. The inlet region 77 is defined by space between the valve element and the cavity 71 and continuously communicates with the inlet passage 23. The land 79 is contoured to communicate the inlet passage with the control port 18 when the valve element is rotated in the first direction, to communicate the inlet region with the control port 19 when the valve element is rotated in the second direction, to block communication between the inlet region and both control ports at the neutral position of the valve element, to communicate both control ports with the drain pocket at the neutral position of the valve element, to maintain communication between the control port 19 and the drain pocket when the valve element is rotated in the first direction, and to maintain communication between the control port 18 and the drain pocket when the valve element is rotated in the second direction from the neutral position. The valve element also includes a force balancing pocket 81 recessed into the face 76. The pocket 81 is a mirror image of the drain pocket 78 and is in continuous communication therewith.

An input shaft 83 extends into the body 34 and is rotatably supported by a pair of bearings 84,86. The valve element 13 is suitably connected to an end portion 87 of the shaft 83 by a spline connection 88 while the cam 38 is suitably connected to the shaft so that the valve element, the cam and the input shaft rotate in unison. The centering mechanism 68 is suitably connected to the input shaft for resiliently biasing the input shaft to a position corresponding to the neutral position of the valve element 13.

Industrial Applicability

In operation, a left turn is initiated by rotating the valve element 13 clockwise as viewed in the drawings to direct a control signal to the steering system 11 through the control port 18. The initial rotation of the valve element establishes communication between the input passage 23 and the groove 41 to direct regulated pressure through the passageway 42 and the annular groove 39 to the control port 18. As viewed in FIG. 4, the initial clockwise rotation of the valve element also blocks communication between the groove 44 and the tank passage 21 so that the pilot fluid entering the groove 41 passes through the passageway 42 and the annular groove 39 to the control port 18. The groove 44 remains in communication with the tank passage 21 thereby maintaining communication between the control port 19 and the tank 22. Prior to establishing communication between the input passage 23 and the groove 41, the cam 38 depresses the plunger 61 displacing the valve spool 16 downward to communicate the supply passage 29 with the outlet 32 through the passageway 62. This causes a controlled metering of pressurized fluid in the supply passage 29 to the outlet 32 and thus the input passage 23 and the control port 18. The rate of displacement of the plunger 64 and thus the regulated pressure level of the pilot fluid in the control port 18 is dependent upon the profile of the cam 38. The regulated pressure in the chamber 63 acts on the end of the spool 16 so that the regulated pressure in the input passage 23 is proportional to the force exerted on the spool 16 by the spring 67 and thus is predetermined by the profile of the cam 38.

Rotating the valve element 13 counterclockwise back to the neutral position shown again communicates the control port 18 with the tank passage 21 to vent the control signal directed to the steering system 11 so that the steering mechanism returns to a straight travel condition.

A right turn is accomplished in substantially the same manner as a left turn with the valve element being rotated counterclockwise to establish the fluid flow path 27 from the input passage 23 to the control port 19 while maintaining the flow path 28 from the control port 16 to the drain passage 21.

The centering mechanism 68 automatically returns the valve element 13 to the neutral position shown when the forces applied to turn the valve element are released.

The operation of the second embodiment is essentially as described above with the exception that communication between the input passage 23 and the control ports 18,19 is established through the inlet region 77 while communication between the control ports to the drain passage is controlled by the drain pocket 78. More specifically, clockwise rotation of the valve element as viewed in FIG. 8 causes the inlet region to communicate with the control port 18 while maintaining communication between the drain pocket 78 and the drain pocket 78. Conversely, rotating the valve element counterclockwise communicates the inlet region 77 with the control port 19 while maintaining communication between the control port 18 and the drain pocket 78. Any axial force generated by pressurized fluid in the drain pocket 78 is balanced by the force generated by the equivalent fluid pressure in the balance pocket 81.

In view of the foregoing, it can be appreciated that the rotary control valve device 10 is simple in construction and reliable in operation. This is accomplished by utilizing the fluid flow valving of the valve element 13 of the directional control valve 12 for directing fluid flow between the input passage 23 and the control ports 18 and 19 with the level of the regulated pressure being controlled by a single pressure regulating valve 14 mechanically actuated by the cam 38 connected to the valve element for unitary rotation therewith.

Other aspects, objects and advantages of this invention can be obtained from a study of the drawings, the disclosure and the appended claims.

We claim:

1. A rotary control valve device comprising:
    a directional control valve having an input passage and first and second control ports, a valve element having a neutral position and being rotatable in a first direction therefrom to communicate the input passage with the first control passage and in a second direction therefrom to communicate the input passage with the second control passage;
    a pressure regulating valve connectable to a source of pilot fluid and having an outlet communicating with the input passage of the directional control valve and a valve spool movable in response to pressurized fluid at the outlet thereof in a first rectilinear direction to regulate the pressure level in the outlet of the pressure regulating valve; and
    means for mechanically imparting the rectilinear movement to the valve spool of the pressure regulating valve in a second, opposite direction in response to rotary movement in either direction from the neutral position of the valve element of the directional control valve.

2. The rotary control valve device of claim 1 wherein the imparting means includes a cam connected to the valve element for unitary rotation therewith, a plunger, and a spring disposed between the plunger and the valve element.

3. The rotary control valve device of claim 2 wherein the regulated pressure level in the outlet is dependent upon the extent of rotary movement of the valve element.

4. The rotary control valve device of claim 3 wherein input passage is blocked from both control ports at the neutral position of the valve element.

5. The rotary control valve device of claim 3 wherein rotating the valve element in the first direction establishes a first flow path therethrough from the input passage to the first control port and rotating the valve element in the second direction establishes a second flow path therethrough from the input passage to the second control port.

6. The rotary control valve device of claim 5 wherein the directional control valve includes a drain port communicating with both control ports at the neutral position of the valve element and rotation of the valve element in the first direction from the neutral position blocks communication between the first control port and the drain port and maintains communication between the second control port and the drain port while rotation of the valve element in the second direction from the neutral position blocks communication between the second control port and the drain port and maintains communication between the first control port and the drain port.

7. The rotary control valve device of claim 6 wherein the directional valve includes a multi piece body having a cylindrical cavity defined in part by a pair of opposed parallel walls wherein the valve element is rotatably disposed within the cavity and has a pair of parallel end faces sealingly engaging the walls.

8. The rotary control valve device of claim 7 wherein the valve element includes an inlet region defined by the valve element and the cylindrical cavity and being in continuous communication with the inlet passage, a drain pocket recessed into one of the parallel end faces and a land sealingly engaging the adjacent wall and separating the drain pocket from the inlet region.

9. The rotary control valve device of claim 8 wherein the land is contoured to communicate the inlet passage with the first control port when the valve element is rotated in the first direction and to communicate the inlet passage with the second control port when the valve element is rotated in the second direction.

10. The rotary control valve device of claim 9 wherein the land blocks communication between the inlet region and both control ports at the neutral position of the valve element.

11. The rotary control valve device of claim 10 wherein the drain pocket is contoured to communicate both control ports with the drain passage at the neutral position of the valve element and to maintain communication between the second control port and the drain passage when the valve element is rotated in the first direction and to maintain communication between the first control port and the drain passage when the valve element is rotated in the second direction.

12. The rotary control valve device of claim 11 including a force balance pocket recessed into the other one of the parallel end faces and is a mirror image of the drain pocket and continuously communicates therewith.

13. The rotary control valve device of claim 12 wherein the directional control valve includes an input shaft extending into the body, the valve element and the cam being connected to the input shaft for unitary rotation therewith.

14. The rotary control valve device of claim 6 wherein the first flow path includes a first annular groove in the outer surface of the valve element continuously communicating with the first control port, a first C-shaped groove in the outer surface of the valve element and a first passageway continuously communicating the first C-shaped groove with the first annular groove, and the second flow path includes a second annular groove in the outer surface of the valve element continuously communicating with the second control port, a second C-shaped groove in the outer surface of the valve element and a second passageway continuously communicating the second C-shaped groove with the second annular groove, the C-shaped grooves being disposed within a plane perpendicular to the longitudinal axis of the spool, and a pair of lands separating the C-shaped grooves.

15. The rotary control valve device of claim 14 including a pair of force balancing C-shaped grooves disposed on opposite sides of the first C-shaped groove in the outer surface of the valve element and continuously communicating with the second passageway and another pair of force balancing C-shaped grooves disposed on opposite sides of the second C-shaped groove in the outer surface of the valve element and continuously communicating with the first passageway.

16. The rotary control valve device of claim 15 wherein one of the pair of lands controls fluid flow between the inlet passage and the first and second C-shaped grooves and the other of the pair of lands controls fluid flow between the first and second C-shaped grooves and the drain passage.

17. The rotary control valve device of claim 16 wherein the directional control valve includes a multi piece body having a first bore therein and a second bore therein opening into the first bore and disposed substantially perpendicular thereto; the control ports, the inlet passage and the drain passage opens into the first bore; the valve element is rotatably disposed within the first bore and has the cam formed thereon as an integral part thereof; and the plunger is slidably disposed within the second bore for mechanical actuation by the cam.

* * * * *